Oct. 13, 1953
J. G. WEHRWEIN
2,655,574
FLOAT SWITCH FOR WATER COOLERS
Filed April 11, 1950
2 Sheets-Sheet 1
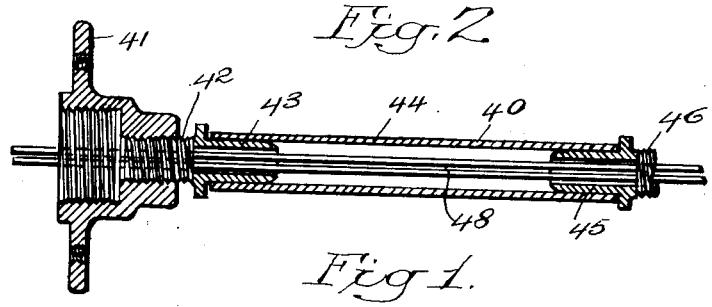
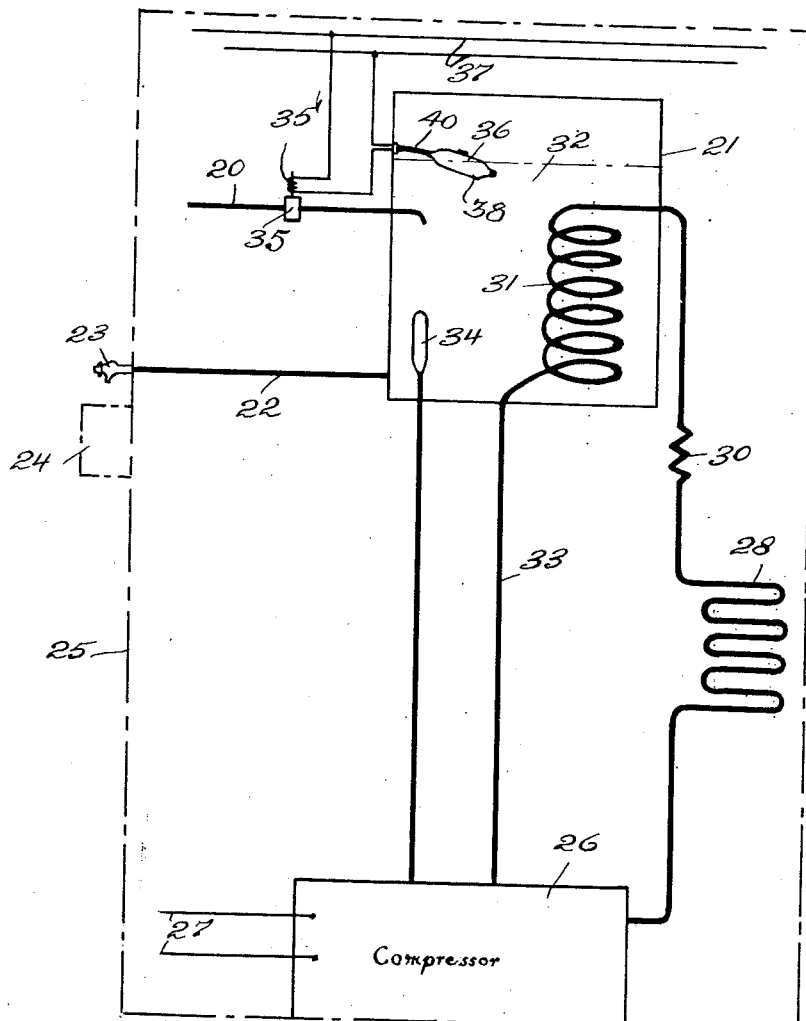
INVENTOR
John G. Wehrwein.
BY
ATTORNEYS.

Oct. 13, 1953     J. G. WEHRWEIN     2,655,574
FLOAT SWITCH FOR WATER COOLERS
Filed April 11, 1950                    2 Sheets-Sheet 2
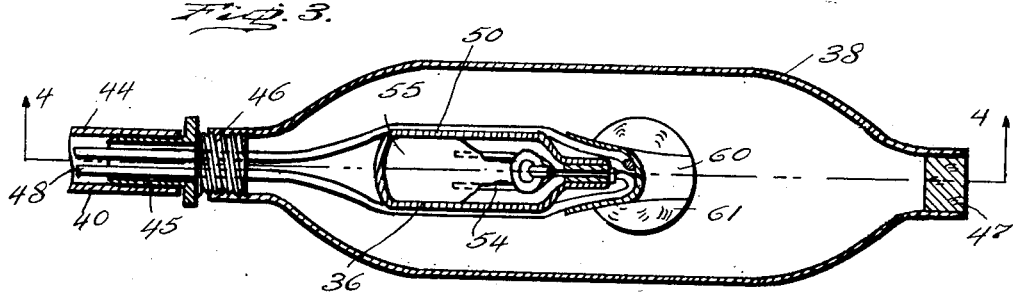
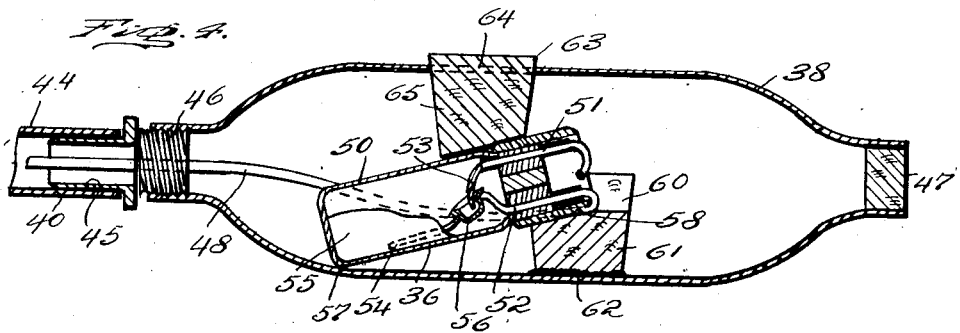
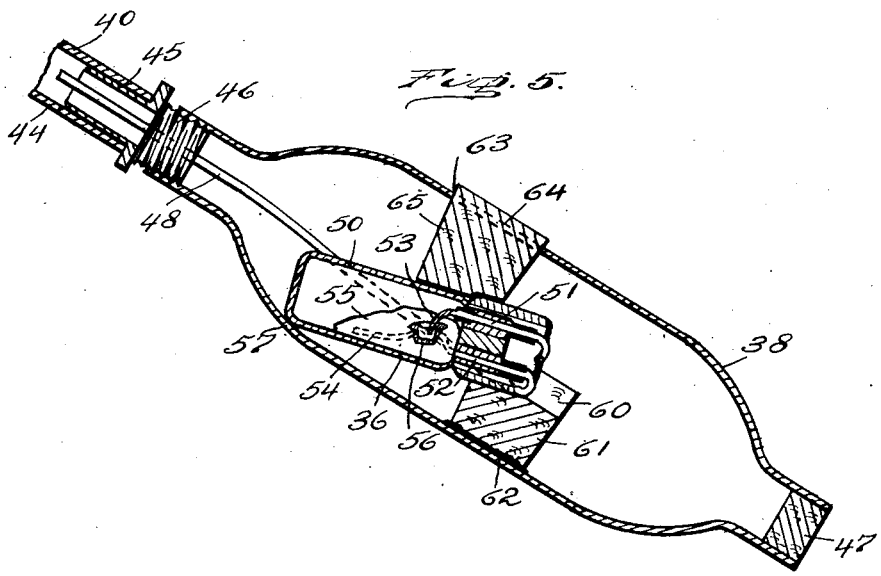
INVENTOR
John G. Wehrwein.
BY
ATTORNEYS Patented Oct. 13, 1953

2,655,574

UNITED STATES PATENT OFFICE 2,655,574

FLOAT SWITCH FOR WATER COOLERS

John G. Wehrwein, Havertown, Pa., assignor to Sunroc Refrigeration Company, Dover, Del., a corporation of Delaware Application April 11, 1950, Serial No. 155,250

1 Claim. (Cl. 200—84)

The present invention relates to water coolers and particularly to float switches therefor.

A purpose of the invention is to increase the safety and reliability of water cooler float switches.

A further purpose is to provide a protected and comparatively shock-proof mounting for a water cooler float switch.

A further purpose is to prevent a water cooler float switch from closing due to slight vibration.

A further purpose is to assure that a water cooler float switch can readily be inspected or replaced as required.

A further purpose is to mount a water cooler float switch in a resilient (preferably cork) saddle and to hold the switch in the saddle by resilient (preferably cork) pressure from a closure in the wall of a float.

A further purpose is to provide a cup surrounding a contact of a water cooler float switch to prevent closing of the contact until the cup fills with mercury.

Further purposes appear in the specification and in the claim.

In the drawings I have chosen to illustrate one only of the numerous embodiments in which my invention may appear, selecting the forms shown from the standpoints of convenience in illustration, satisfactory operation and clear demonstration of the principles involved.

Figure 1 is a diagram of a water cooler system employing the float switch of the invention.

Figure 2 is an axial perspective of the float mounting.

Figure 3 is an axial section of the float and a portion of the mounting, the section being taken in a horizontal plane.

Figure 4 is a section of Figure 3 on the line 4—4.

Figure 5 is a view corresponding to Figure 4 showing the float in a lower position whereas Figure 4 shows the float in a raised position.

Describing in illustration but not in limitation and referring to the drawings:

In water coolers particularly of the electrically refrigerated type it is very desirable to control the inlet of water by the water level. The space available is not adequate for effective control by a conventional float valve, and it is important to obtain more reliability than is possible with the usual float valve, and accordingly efforts have been made to use electric float switches. Such switches have been only moderately successful. In most cases leverage or other mechanism is provided from a float extending to a point outside the tank and there operating a remotely located float switch. Such remote connections are complicated and expensive and give a great deal of trouble through leakage, corrosion or failure to function.

In accordance with the present invention, the float switch is actually placed in the water tank but is so mounted that it is safe, reliable and easy to service or inspect.

The switch is protected against damage through vibration and also against "hunting," i. e. cycling on and off at short intervals due to change in switch position from the effects of vibration, even though the water level is not such as to require opening and closing of the switch.

The water cooler may be of any conventional character, Figure 1 showing a water cooler having an inlet water pipe 20 discharging into a water cooler tank 21 suitably open to the atmosphere at the top. Water from the tank is withdrawn by a pipe 22 to a dispenser 23 suitably mounted over a catching basin 24 on any desired cabinet 25.

Any desired refrigeration procedure may be used, a motor compressor 26 being shown connecting to an electric circuit 27 and supplying compressed refrigerant to a condenser 28 from which it flows through a constrictor 30 to an evaporator 31 in heat transfer relation with water 32 in the tank 21. Return to the compressor from the evaporator is provided at 33. A thermostat 34 in heat transfer relation with the water 32 controls the operation of the motor-compressor, as well known.

The control of inflow of drinking water through the pipe 20 is by a solenoid valve 35 suitably of the normally closed type spring urged toward closing, and opened by energization of solenoid 35' in series with mercury electric switch 36 connected to electric circuit 37.

Electric switch 36 is contained within a float 38 suitably of aluminum or other light material connected to a float arm 40 which is mounted on a fitting 41 secured to the wall of the tank.

The float arm includes a nipple 42 threaded into the fitting and having a hollow interior to pass wires, the nipple at its outer end carrying a shank 43 which engages a flexible tube 44 surrounding and resiliently engaging shank 43. The tube is of any suitable flexible material, preferably polyvinyl chloride, polyvinyl acetate, polyvinyl chloride acetate, rubber, or synthetic rubber of high flexibility. The rubber or plastic may be of a durometer between 20 and 60. At the remote end, the tube 44 fits around and grasps the shank 45 of hollow nipple 46 which threads into one reduced end of the bottle-shaped float 38. The opposite end of the float is closed as by a stopper 47.

Flexible insulated wires 48 pass through the float arm to the mercury switch 36. The mercury switch comprises an insulating container 50 suitably of glass hermetically sealed, having leads 51 and 52 passing through the wall respectively to a downwardly directed electrode 53 in the upper portion of the interior of the switch chamber and a bottom electrode 54 extending down into a mercury pool 55.

The depending electrode 53 is surrounded by a suitable cup 56 of refractory or other insulation supported on the electrode 54.

The mercury switch is canted or inclined so that the electrode 53 and cup 56 are above the mercury pool 55 in horizontal position of the float as shown in Figure 4. This canting is accomplished by resting one end 57 of the envelope on or adjacent to the wall of the float and mounting the other end 58 in a slotted saddle 69, desirably formed in a resilient cushion 61, suitably a cork, secured to the bottom of the inside of the float as by cement 62.

The cushion 61 and the mercury switch are inserted into the float and may be removed from the float through an access opening 63 preferably located in the top of the float so that it will not be below the water level. The access opening 63 is closed by a stopper, suitably a cork, 64 which presses down at 65 on the top of the mercury switch and thus anchors the mercury switch firmly in the saddle 60.

It will be evident therefore that the stopper 64 performs three functions: one of closing the access opening, another positioning the mercury switch against juggling out of the saddle and a third of providing a cushion or shock mounting which combines with the cushion or shock mounting of the saddle.

In operation, the float is assembled to the float arm, the saddle is mounted in the float and then the mercury switch is inserted and its wires carried through the float arm. The mercury switch is located in inclined position in the saddle and then the stopper 64 is inserted which holds the mercury switch in position.

The entire float arm assembly is then inserted in the tank, placing the fitting 64 above the water level to be maintained. The float switch is then wired to the solenoid valve and to the source 37.

When the water is up to the required level in the tank, the float switch is in the position of Figure 4, in which case most of the mercury has poured out of the cup 56 and no electrical connection is being made between the electrode 53 and the electrode 54 which is in contact with the pool of mercury. The normally closed solenoid switch then cuts off inflow of water to the tank.

Should the water vibrate due to vibratory forces in the neighborhood, the mercury may undergo some movement but the upwardly directed cup 56 surrounding the lower edge of the electrode 53 will prevent completing the electrical circuit until the switch tilts down to a position approaching that of Figure 5, in which case the mercury pours over the cup and connects the electrodes. When the switch thus closes, the solenoid is energized and opens the solenoid valve allowing water to enter the tank.

As soon as the water level rises high enough, the float will rise and the switch will open, causing the solenoid valve to close. In case the tube 44 should leak, the float arm switch will still operate as long as the float does not lose its buoyancy.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claim.

Having thus described my invention what I claim as new and desire to secure by Letters Patent is:

In a float switch device for control of liquid level, a resilient support, a float at one end of the support, a sealed switch in the float having walls forming an upwardly directed receptacle at the bottom thereof, a pool of mercury in the receptacle, a contact connected to the pool, an electrically insulating upwardly directed cup supported in the sealed switch at a level above the bottom of the receptacle, in one position of the switch above the top of the pool of mercury, and in another position of the switch below the top of the pool of mercury, a contact extending from above into the cup and insulated from the pool in one operative position of the float, and wires extending through the support to the contacts.

JOHN G. WEHRWEIN.

References Cited in the file of this patent

UNITED STATES PATENTS

| Number | Name | Date |
|---|---|---|
| 1,676,752 | Walker | July 10, 1928 |
| 1,978,817 | Raue | Oct. 30, 1934 |
| 2,076,547 | Carlson | Apr. 13, 1937 |
| 2,136,220 | Shepherd | Nov. 8, 1938 |
| 2,240,880 | Bennett | May 6, 1941 |